Nov. 13, 1928.
H. SCHLAICH
1,691,133
TEMPERATURE INDICATING DEVICE
Filed Feb. 23, 1918
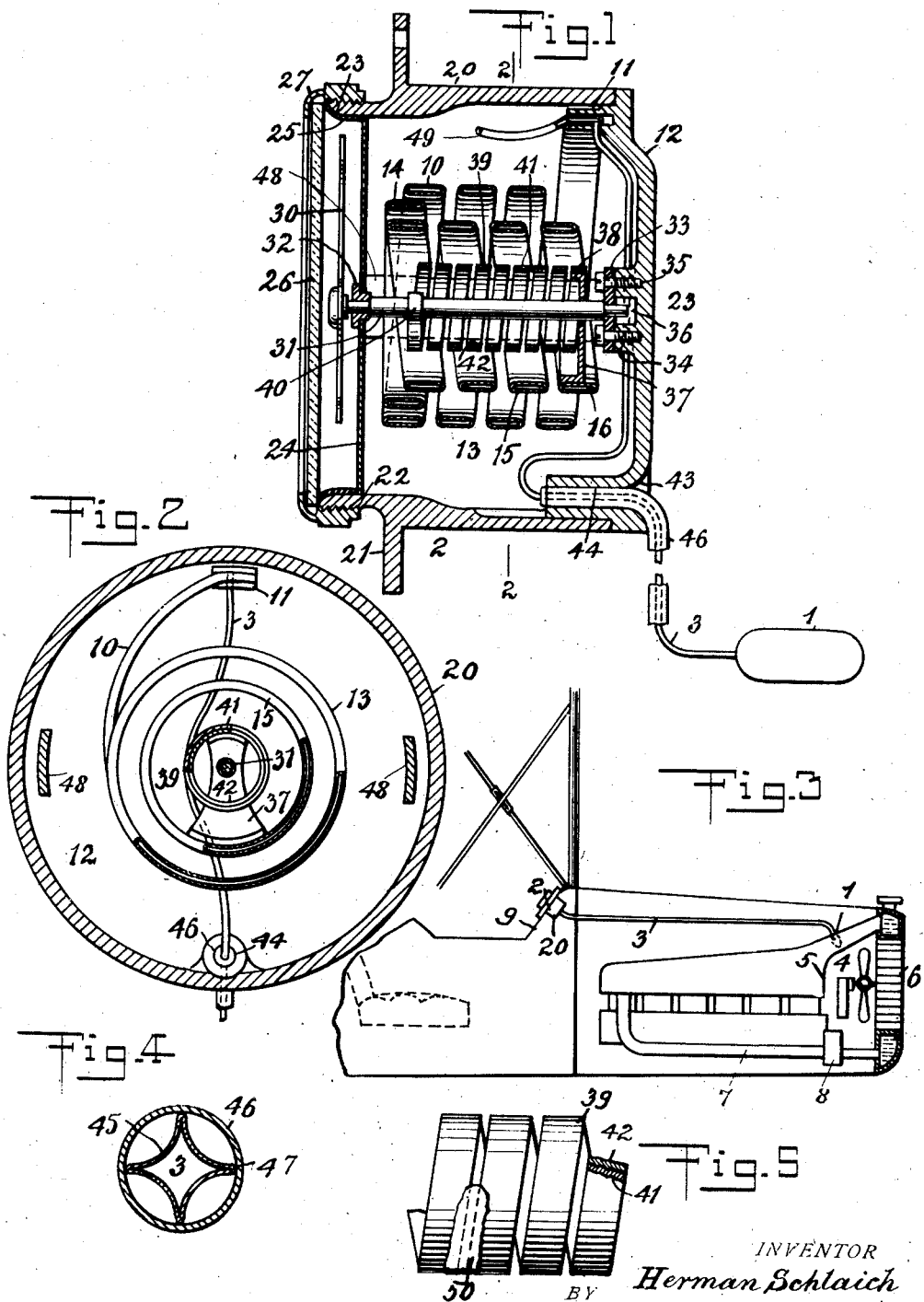
INVENTOR
Herman Schlaich
BY
William F. Nickel
ATTORNEY Patented Nov. 13, 1928.

1,691,133

UNITED STATES PATENT OFFICE.

HERMAN SCHLAICH, OF BROOKLYN, NEW YORK.

TEMPERATURE-INDICATING DEVICE.

Application filed February 23, 1918. Serial No. 218,801.

This invention relates to improvements in gages and is more particularly designed to provide an instrument for the indication of temperatures in connection with the internal combustion motors of aeroplanes or other vehicles, such as automobiles or motorboats. The advantages of the use of an instrument for indicating the thermal condition of internal combustion engines are well known but the problem of devising a satisfactory and accurate instrument which will meet the requirements of practice is difficult as the conditions of use introduce numerous sources of error which must be compensated for or from which the instrument must be rendered immune. Thus an instrument utilized upon a motor-driven vehicle is necessarily subjected to severe vibration and must be of such a character as not to be thereby prevented either from indicating accurately or from being substantially dead beat; so that it may be easily read. Such an instrument must also be of such a character that its indications will be accurate in spite of variable temperature conditions to which parts of the instrument other than the temperature responsive element thereof may be subjected. It is also important that the instrument shall not be subjected to error due to varying atmospheric pressure, this condition being vital where the instrument is intended for aeroplane use owing to the wide range of atmospheric pressure due to altitude.

The principal object of the present invention is to provide an instrument which is not sensitive to or which is duly compensated for the effects of the various factors named so that it shall be capable of use for the accurate measurement of the temperatures of the motors of aeroplanes and other vehicles and for other purposes, and which shall be light, compact, durable and present no manufacturing difficulties which would prevent it from being manufactured at a reasonable cost and upon a quantity production basis.

The nature of the improvements by which I secure the foregoing and other objects will best be understood in connection with the description of one specific embodiment of the invention which I have chosen for illustration in the accompanying drawings forming a part of this specification and in which drawings Figure 1 is a vertical sectional view of the gage. Figure 2 is a transverse sectional view thereof. Figure 3 is a diagrammatic view illustrating one way in which the instrument may be applied for the measurement of temperatures in the cooling system of an aeroplane engine. Figure 4 is a cross section on a large scale of an improved form of capillary tube and casing which may be employed. Figure 5 is a detail view of a part of the compensating coil showing how adjustment thereof may be made by soldering portions of the coil together.

The particular type of instrument which I have chosen to illustrate the principle of my invention and the best mode now known to me for performing the same, comprises what is known as a distance type thermometer, which I have shown applied to the cooling system of an aeroplane motor. Referring to Figure 3, this type of instrument comprises a temperature responsive element or bulb 1, which is to be placed in such a location as to be subjected to the temperature to be measured, an indicating instrument or gage 2 and a connection in the form of a small bore tube or capillary 3 between these two elements. As illustrated, the bulb 1 is inserted in the return pipe 4 which conveys the heated cooling fluid from the cylinder jackets 5 of the engine to the upper part of the radiator 6, the water flowing downwardly through the radiator and becoming cooled, after which it returns to the cylinder jackets through the inlet pipe 7. Circulation of water may be maintained in any suitable manner as by means of a circulating pump 8. The mode of operation and advantages of an instrument having the temperature responsive element thus located are fully set forth in the patent to Boyce No. 1,206,783, and I prefer this location for such element, but it is to be understood that the use of this invention is not limited to this location. The gage 2 is located in any suitable position for observation by the driver of the vehicle, preferably upon the vehicle dash or instrument board 9.

The gage 2 comprises a pressure sensitive element and indicating or recording means actuated thereby. As illustrated in Figures 1 and 2, the pressure sensitive element is in the form of a multiple coiled flattened tube or "Bourdon spring" 10, one end of which is in communication with the end of the tube 3 and is mounted upon a suitable fixed support; while the free end of the flattened tube or spring is closed. For reasons which will be hereinafter explained, it is very desirable to utilize a Bourbon coil or spring of a considerable number of turns and in order to secure this result and at the same time keep the instrument within the required limits as to the size I have discovered that I may without interfering with the proper operation of the spring, coil the same into a compound helix having a plurality of turns progressing in one direction axially and then back in the opposite axial direction, either inside or outside of the first series of helical turns, all the turns, however, being in the same circumferential direction. As illustrated, the fixed end of the Bourdon coil or spring is carried in a forked bracket 11 projecting from the base plate 12. Starting from this end, the coil is wound into a plurality of turns forming an outer helix 13 progressing away from the base 12, then through an intermediate turn 14 into a second series of turns 15 comprising a helix concentric with the helix 13 but of smaller diameter and progressing in the opposite axial direction, to the closed free end of the coil at 16. All of the turns of the coil, however, are formed in the same circumferential direction, so that the entire coil acts as a unit. In accordance with the well-known action of Bourdon springs, variations in pressure within the coil will tend to cause it to unroll when the pressure is increased or permit it to roll up when the pressure is decreased, and as the effect of the various turns is cumulative throughout the coil, a very considerable movement of the free end of the coil may be secured. In the instrument shown the Bourdon spring or coil 10, capillary tube 3 and bulb 1 are completely filled with a liquid which is preferably under considerable initial pressure. Any suitable liquid may be employed, preferably alcohol, as this possesses the necessary thermal qualities, does not freeze at ordinary temperatures, and does not tend to amalgamate with the metal of which passages of the instrument are constructed, thus permitting the use of brass or copper, which would not be possible were mercury utilized.

In practice the coil 10 is wound so that the turns thereof receive a permanent "set", and will normally act to hold the free end of the coil in a definite fixed position. When, under the influence of the liquid in the coil and in the bulb 1 and tube 3, the coil 10 unwinds, the free end thereof is moved away from this position; and as soon as the liquid ceases to affect the coil 10 in such a way the turns 13, 14, and 15, are constrained by their own elasticity or resiliency, to roll up again and restore the free end of the coil to its starting point. This mode of operation will be more fully explained hereinafter.

The base plate 12 to which the fixed end of the Bourdon spring is secured forms the back or bottom of the instrument casing 20. The latter in the particular construction illustrated is provided with an intermediate flange 21 adapted to be attached to the dash or instrument board 9, the forward end of the casing projecting beyond this flange and being provided with a screw thread 22 and with a rounded shoulder or seat 23. A dial plate 24 is provided at the front of the casing, this dial plate being made to abut against a ring adapted to fit in the front end of the casing and being outwardly curved or flared so as to rest snugly upon the seat 23. The front of the instrument is closed by a glass or crystal 26, which is adapted to be clamped against the periphery of the ring 25 by a bezel 27 screwing on the threads 22, the bezel thus serving to retain both the crystal and ring in position, and by its removal permitting the crystal and the ring 25 to be taken out. An indicating member, such as a pointer or hand 30, is located in the space between the crystal and dial plate, the hand being mounted upon an arbor 31 journaled at its front end in a bushing 32 in the dial plate and its rear end in a bearing plate 33 secured to a boss 34 on the base plate 12 in any suitable manner, as by means of screws 35, this boss 34 being provided with a central recess 36 to receive the projecting end of the arbor.

The free end 16 of the Bourdon spring or coil has attached to it one end of a lever 37, which lever is journalled to rotate on the arbor 31. The opposite end of the lever is attached to one end 38 of a compensating coil 39, the other end of which 40 is fixed to the arbor 31. The compensating coil 39 is preferably formed of super-imposed and firmly united layers of materials having different co-efficients of expansion, such for instance, an outer layer 41 of brass and the inner layer 42 of nickel steel. The invention of course is not limited to these particular materials as any other construction of thermo-responsive element having the desired properties may be employed. When subjected to changes in temperature, the action of a bimetallic coil of this character will be to wind or unwind somewhat due to differences in expansion of the layers of material of which the coil is made and as the coil constitutes the operative connection between the free end of the Bourdon spring 16 and the arbor carrying the indicating hand, it will be seen that the winding or unwinding of the compensating coil will produce a relative adjustment of position between the index hand and the end of the Bourdon spring.

Specifically, a relatively high temperature in the vicinity of the Bourdon spring 10, which might cause this spring to unwind more than is warranted by the thermal condition of the cooling agent in the engine jacket 5, and move the pointer 30 too much, so that the pointer would indicate a temperature higher than the true temperature of the cooling agent; will affect the compensating coil 39 so as to cause it to roll up, and lessen the movement of the pointer 30. As a result the pointer will indicate the real temperature of the cooling agent and no more. Also if the temperature around the spring 10 be relatively low, as on very cold days, the spring 10 by itself might indicate a temperature less than that of the cooling agent; but in this instance, the coil 39 unwinds and tends to increase the swing of the pointer, giving the same accuracy as before.

A useful feature of construction which I preferably employ consists in forming around the opening in the back plate or casing through which the capillary tube is led into the instrument a countersink or depression having an annular convex rounded wall 43 merging into the cylindrical wall of an opening 44, which fits the capillary tube or its casing closely. The rounded wall 43 permits the tube to be led into the instrument from any direction without danger of putting a short bend or kink therein which might result in breaking the tube or flattening it out so as to interfere with the free communication therethrough.

While any suitable form of capillary tube may be employed, I preferably utilize the construction described and claimed in my application Serial No. 227,754, filed April 10, 1918, and illustrated in detail in Figure 4. As here shown the capillary tube 3 is formed from a circular tube by longitudinally forcing in the walls thereof at a plurality of circumferentially spaced points as indicated at 45, thereby producing a tube having what may be termed a "starlike" cross section. In this way the cross-sectional area of the tube is materially reduced and it is possible to produce a tube having a capillary bore of much less area than can be attained by ordinary processes of drawing. At the same time, the form of the tube is such that it is not easily flattened out in such a way as to completely close the passage therethrough for the reason that even if the depressed portions of the tube come into contact, there will almost invariably remain a passage through some part of the cross section. The tube 3 is preferably enclosed in a casing 46 consisting of a circular tube of copper or other flexible material of slightly larger diameter than the capillary tube. The tube 3 may advantageously be introduced in the tube 46 at the same time that it is rolled in the star-like form as explained in my application above referred to. The starlike form of the tube 3 lends itself particularly to encasement in this manner as it will bear against the encasing tube only at one or more of the points 47.

The transmission of heat from one tube to the other is thus minimized so that the encasing tube, as well as forming a mechanical protection for the capillary tube, also provides an air space between the two tubes which acts as a thermal insulation for the capillary tube.

The term "capillary tubing" as used in the present specification and claims is intended to define tubing of the smallest capacities, in which the bore is of hair-like dimensions. Moreover, in the distance type instrument art, to which the present invention relates, the term "capillary" or "capillary tube" has an accepted meaning as designating the pressure transmitting tubing, connecting the bulb of the instrument with the instrument head or indicating parts proper which latter usually consists of a Bourdon spring which is so shaped as to change its form in response to changes in internal pressure and which therefore is necessarily of much greater than capillary dimensions as that term is herein employed.

A useful feature of construction of the casing shown consists in providing the back plate 12 with two supports 48 that extend from the inner face of the back plate towards the glass 26. To these supports the dial 24 is fixed; and the supports will be long enough to make the dial contact with the ring 25 when the back plate is fastened to the casing 20. Hence I can make up the back plate, the dial, the pointer, the arbor, the Bourdon spring, and the compensating coil as a single unit, thus greatly simplifying and facilitating the manufacture and making possible the quick and easy assembling and dismounting of the parts of the instrument at will.

Considering now the operation of the apparatus described and assuming that the engine is at rest, the water in the cooling system therein will be at a certain temperature generally approximately the temperature of the surrounding air. Upon starting the engine in operation, the water in the water jackets will begin to heat up and will also begin to circulate through the return pipe towards the radiator. The temperature to which the bulb 1 in this water will be subjected will thus rise gradually causing the liquid in the bulb to expand and move the column of liquid in the capillary tube 3, which in turn produces an increase in pressure in the Bourdon spring or coil, thereby making the latter tend to open out or unwind and providing a movement of the free end 16 of the coil. This movement of the free end of the coil acting through the lever 37 and compensating coil 39 rotates arbor 31 and the index hand 30 to a more or less extent, thus causing the index hand to indicate the increase in temperature which has taken place. Assuming that the instrument is properly calibrated, if all conditions remain the same except the increase in temperature of the water in the return pipe, then the movement of the hand 30 will indicate accurately the rise in temperature of this cooling water. If the temperature in the return pipe 4 falls, the liquid in the bulb 1, tube 3 and spring 10 will contract and the spring 10 due to its own elasticity, will wind or roll up, and correspondingly move back both the arbor and the pointer 30.

To ensure such a mode of operation the spring 10 must first be put under a positive stress sufficient to unwind it partly, and great enough to counterbalance the force which is due to the elasticity of the turns 13, 14 and 15 and which tends to act in the opposite manner and wind or roll up the spring when the latter is unwound by the liquid therein. When this condition exists the proper sensitiveness of the spring 10 is obtained and the condition in question must exist not only when the pointer 30 is on the higher marks of the scale on the dial plate 24, but also when the pointer is on the lowest extremity or starting point of the scale. Hence the necessity for putting the liquid into the spring 10, tube 3 and bulb under some initial pressure as above stated; or adopting an equivalent expedient. If the spring 10 after being wound and connected to the pointer through the coil 39 and arbor 31, were not put under any initial stress to unwind it; that is, if the liquid merely filled it and did not act to overcome the coils and unwind them to the required extent, and expansion of the liquid would unroll the spring, but the contraction of the liquid would be followed by the winding up of the spring only until a certain point was reached. If, for example the pointer were at 60 degrees, and the liquid merely filled the spring 10 without being constrained to unwind it a little the expansion of the liquid would unroll the spring and make the pointer go higher on the scale; but when the liquid cooled and contracted again the pointer would come back to 60 degrees and go no lower even if the temperature of the liquid sustained a further drop. After long use the pointer would not even come back to 60 degrees, because the spring 10 would gradually become distended permanently and never restore the pointer beyond a few degrees over 60.

I avoid this possible drawback by putting on the spring 10 an initial stress tending to unwind it. This initial stress can be secured by applying to the liquid in the spring 10, tube 3 and bulb 1 as much pressure as is needed. If at 70 degrees F., room temperature, I fill the bulb, tube and spring, removing all air, and then apply a pressure of 300 lbs. per square inch, the pointer 30, assuming same to be at 70 degrees on the scale of the dial plate, will move up to about 120 degrees. I then seal up the spring, tube and bulb; thereby retaining the pressure of the liquid, and I then turn back the pointer on the arbor 31 to 70 degrees again and make it fast to the arbor. If now the temperature in the bulb 1 goes above 70 degrees, the pointer will move above 70 degrees on the scale; and if the temperature in the bulb goes below 70, the pointer can go below 70 degrees on the scale. In other words even when the liquid contracts to let the elasticity of the spring 10 move the pointer below 70 degrees the volume of the liquid will still be great enough to keep the turns of the spring under stress and allow the elasticity of the latter to make the turns follow up the liquid as it shrinks. The action of the spring is very certain, and the amount of stress of the spring 10 for any temperature below the first indication on the scale is technically known as "under pressure". Of course, when the tube, bulb and spring are sealed and the instrument cut off from the source of pressure that produces the initial stress on the spring, the liquid does not exert an active pressure from within on the spring 10 at all. The elasticity of the volume of enclosed liquid and the elasticity of the turns of the spring simply balance each other at any temperature. When the temperature rises, the liquid expands and overcomes the spring till this balance is restored, and the same action takes place when the temperature drops. Obviously the same effect can be gotten by putting the bulb 1 into a freezing mixture while filling and warming up after sealing. By this method no pressure on the liquid need be employed when the filling operation is being performed.

A short filling tube 49 may be connected to the fixed end of the spring 10. If this tube is used as an inlet, the bulb, tube 3 and spring 10 must first be emptied of air. After filling, pressure can also be applied to the enclosed liquid through the inlet 49; and then sealing is effected by pinching the inlet 49 shut and soldering the end of the latter.

In practical use, all of the conditions surrounding the instrument vary greatly; thus as soon as the engine is started, all of the apparatus is subject to pronounced vibration. As the engine heats up, the tube 3, which ordinarily passes somewhere in proximity to it has its own temperature locally increased and the gage part of the instrument may be subjected to an increase in temperature if located in proximity to the engine or may be subjected to a reduction in temperature if located in an exposed position. If the instrument is utilized on an aeroplane and an ascent has begun, obviously there will be a rapid reduction in the pressure of the atmosphere surrounding the instrument. Variation in the temperature of the capillary tube 3 or of the Bourdon spring 10 will cause the liquid within these parts to expand or contract depending upon whether the temperature rises or falls and will effect a movement of the free end of the index hand, in addition to the movement caused by variations in the temperature at the bulb, and therefore, would tend to give rise to erroneous readings. However, the volume of the liquid in the tube 3 is relatively so small that any local expansion or contraction of the liquid in same due to changes in temperature near it, will not have to be allowed for, as will appear presently. So far as the Bourdon spring itself is concerned however, its expansion and contraction due to local changes in temperature may be completely compensated for by the action of the compensating coil 39. The latter it will be seen acts in opposition to the Bourdon spring; that is to say, a local increase in temperature in the vicinity of the casing 20 which would tend to unwind the Bourdon spring more than the temperature of the fluid in the bulb 1 warrants, and therefore, move the index hand 30 to the right a little too much would also tend to more tightly wind up the compensating coil 39 so as to tend to move the index hand to the left. By utilizing a coil or spring having proper characteristics, the compensating coil will exactly counteract the spring 10 as respects any movement of the latter due to changing local temperature; and the pointer 30 will thus indicate the true temperature of the agent in the pipe 4. By properly designing the compensating coil with relation to the Bourdon spring, this result may be closely secured but if further adjustment is needed to secure exact equalization of any errors, the coiled bi-metallic element lends itself particularly to this purpose, as adjustment may be secured by merely soldering together portions of the coil adjacent to one end thereof, as indicated for example at 50 in Figure 5. This soldering together throws out part of the coil and reduces the movement for a given change in temperature.

While the use of a thermostatic compensating element compensates for temperature changes within the gage itself, it cannot be utilized fully to correct for variations in temperature of the capillary tube between the gage and the bulb for the reason that this may be subjected to variations in temperature quite different from those to which the spring 10 is subjected. The capillary tube is insulated from such change as far as possible by the casing 46 and I further minimize the effect of changes in temperature within the capillary tube by making the latter of very small diameter and volume, for instance, by utilizing the construction of capillary tube shown in Figure 4. I also promote the desired result by making the Bourdon spring or coil of very substantial length and capacity or volume as compared with the volume of the capillary tube, with the result that the movements of the spring caused by the local expansion or contraction of the relatively small volume of liquid in the capillary tube, will be very slight.

To give an example of the proportions of the respective parts which may be successfully employed; with a spring 10 measuring 33 inches from its fixed end to its free end and about $\frac{1}{4}$ inch in width, and 20 feet of tubing 3 of .015 inch inside diameter, reshaped as shown, the tubing will hold only $\frac{1}{4}$ of the amount of fluid in the spring; and the spring and tube together will hold only half as much as will be contained in a bulb of convenient size, say $\frac{5}{16}$ inch diameter by $1\frac{3}{4}$ inches in length. The total volume is small, I may use 1 pint of liquid for filling 100 instruments with no allowance for loss. Furthermore the tube 3 will preferably be under the hood and near the engine where it will approximate the temperature of the jacket 5, and any local changes in temperature to which it may be subjected may be left out of account altogether.

The use of a long Bourdon spring of numerous turns is furthermore advantageous in this connection as it gives a degree of movement so considerable as to permit the indicating hand to be driven directly therefrom without the interposition of any movement multiplying means, such as long lever arms or gears. Thus it will be seen that there is no multiplication of the movement of the index hand with respect to the movement of the free end of the Bourdon spring, and therefore, no multiplication of such slight errors as may occur due to the capillary tube. As a result, these errors can be treated as entirely negligible; while if a short Bourdon spring were utilized having a relatively small volume as compared with the volume of the capillary tube, yielding a relatively slight movement so as to require the use of multiplying gearing to drive the hand, the resulting errors would be so great as to render the instrument unserviceable. The elimination of multiplying gearing also has the advantages of promoting simplicity of construction and positiveness of action with elimination of wear and lost motion, thereby reducing the possibility of objectionable effects from vibration.

The use of the long Bourdon spring resulting in the advantages noted is made possible primarily by the presence of my improved coiled bimetallic compensating element, as the long spring unless compensated for local temperature conditions would be a source of error greater probably, than any error due to the capillary tube. The coiled compensating element is particularly advantageous as it is most compact, capable of adjustment as already described, and may be made of such length as to produce the relatively large range of compensating movement required. The practical employment of the long Bourdon coil in a compact and serviceable gage is furthermore permitted by the novel mode of winding in the form of a multiple helical coil as above described, and the whole instrument in consequence may be housed in a casing of relatively small depth from glass to back plate.

Owing to the characteristics of construction above set forth, it is possible to construct the instrument as a liquid-filled instrument operating upon the principle of expansion of the liquid due to temperature changes; as the errors which would otherwise be present in a liquid filled instrument due to local temperature conditions are removed. It is also thus possible to secure the important advantage of a liquid filled instrument, namely that it is free from the effects of atmospheric pressure and may be successfully employed without material error at any altitude. In this respect it possesses marked advantages over air-filled instruments or instruments operating on the vapor tension principle.

If a gas were employed the instrument would not be practical for aeroplane use; because at high altitudes the gas, owing to the lower atmospheric pressure and no matter what would be the temperature in the bulb 1, would expand in the spring 10, tending both to unwind it and to distend the turns of the spring by swelling out the flat sides of the same. As a result the instrument would become too inaccurate to be reliable because the movement of the pointer due to the expansion of the gas might introduce an error of a good many degrees. With liquid, there is no tendency of the contents of the spring, tube and bulb to expand, because the liquid has no internal pressure that would unwind the spring or swell out the flat sides of the turns if atmospheric pressure falls; and this statement is true for all cases, regardless of the extent to which the spring 10 may be caused to unwind to give it some initial stress when the liquid first fills the instrument. The truth of this statement is due to the fact that even though the liquid is supplied to the instrument under pressure, that pressure takes effect as above described by stressing and unwinding the spring 10, till the elasticity of the liquid enclosed in the Bourdon spring and the elasticity of the turns 13, 14 and 15 are balanced; and there is no factor present corresponding to the internal pressure of a gas to affect the instrument in case of a fall in atmospheric pressure and impair the accurate functioning of the various parts.

My invention moreover realizes an advantage over air-filled and vapor filled instruments in being dead-beat or free from the effects of vibration, a very necessary quality in an indicating instrument for use on a vehicle as it makes possible quick and accurate reading thereof. The vapor type of instrument is particularly objectionable in this regard as any vibration of the bulb or even of the capillary tube will result in pronounced vibration or fluctuation of the indicating element even though the gage part of the instrument itself be free from vibration. Air-filled instruments are also subject to the effects of vibration chiefly for the reason that the pressure sensitive member must be made of very light and fragile construction if it is to be successfully operated by the relatively slight pressure variations due to expansion of the contained air.

While I have described in detail a preferred embodiment of my invention, embodying numerous novel features, it is to be understood that I do not wish to be limited in all cases to the use of all of such features as certain of them may be usefully employed separately or without all of the others. The several features do, however, interact and modify the action of each other in such a way that an instrument, particularly for use under the conditions named as upon an aeroplane or automobile, is most satisfactorily constructed by embodying all or substantially all of these features in combination. As modifications may be made in the illustrated embodiment of my invention, I do not intend to limit myself to the specific construction set forth but intend to cover my invention broadly in whatever form its principle may be embodied.

The present application is a continuation in part of my application Serial No. 82,518, for temperature-indicating system for internal combustion engines, filed March 6, 1916, now Patent No. 1,430 688.

Having thus described my invention, I claim:

1. A tubular pressure responsive element for gages wound into compound helical form, some of the coils of the tube being wound in an opposite axial direction to other of the coils but all of the coils being wound in the same circumferential direction.

2. A pressure responsive element for gages comprising a plurality of sets of tubular helically wound coils connected end to end to provide a continuous passage-way therethrough different sets of coils being wound in different axial direction but in the same circumferential direction.

3. In a gage, a support, a pressure responsive element comprising a flattened tube fixed at one end to said support and wound in relatively large turns in a direction away from said support and then in smaller turns in the same rotary direction back towards said support, and an indicating element operatively connected with the free end of said tube.

4. In a gage, an indicating element, a pressure responsive element comprising a flattened tube fixed at one end to a support and wound in relatively large turns in a direction away from said support and then in smaller turns in the same rotary direction back towards said support, a bi-metallic coil within the inner series of turns of said tube, a connection between one end of said coil and the free end of said tube, and a connection between the opposite end of said coil and said indicating element.

5. In a gage, the combination of a helically coiled tubular pressure responsive element, a helically coiled bi-metallic compensating element connected at one end to one end of said pressure responsive element, the helixes formed by said elements being coaxial and said compensating element being interior to the helix of the pressure responsive element, and an indicating element connected to the free end of said bi-metallic compensating element.

6. In a gage, the combination of a Bourdon spring wound into compound helical form, an indicating member operated thereby, and a helically wound bi-metallic strip for modifying the action of said Bourdon spring upon said indicating member, the helix formed by the bi-metallic strip being coaxial with the helix formed by said Bourdon spring and interior thereto.

7. In a gage, the combination of a helically wound Bourdon spring, an indicating member operated thereby, and a helically wound bi-metallic strip mounted substantially concentrically with respect to said Bourdon spring, and arranged to modify the action of said Bourdon spring upon said indicating member.

8. In a gage, the combination of a Bourdon spring wound into compound helical form, comprising concentrically coiled portions each including a plurality of helical turns, a helically wound bi-metallic compensating strip mounted substantially concentrically within said Bourdon coil and operatively connected thereto, a member rotatable about an axis substantially coincident with the axis of said helically coiled compensating member, and an operative connection between said compensating member and said rotatable member.

9. In a distance type thermometer, the combination of a Bourdon coil wound into compound helical form, a bulb and a capillary tube connecting said bulb and coil, said coil being of such length as to have a large volume compared with the volume of the capillary tube, an indicating member arranged to be actuated by said coil, and a compensating member adjacent to said coil and arranged to act upon said indicating member in opposition to the action of said coil thereon when subjected to local temperature variations.

10. In a distance type thermometer, the combination of a helically wound Bourdon coil having multiple turns, a bulb, a capillary tube connecting said bulb and coil, said coil being fixed at one end, a helically coiled bi-metallic compensating element mounted concentrically within said Bourdon coil and having one end operatively connected with the free end of said Bourdon coil, and indicating means operatively connected with the other end of said compensating coil without the interposition of movement multiplying mechanism.

11. In a distance type thermometer, the combination of a long helically wound Bourdon coil, a bulb and a capillary tube connecting said bulb and coil, said coil, bulb and tube being completely filled with a thermally expansible liquid, an indicator operatively connected with said coil in such a way as to have normally the same angular movement as the angular movement of the end of the coil, and a compensating element wound into helical form and placed within the helix formed by the Bourdon coil and arranged to act upon said indicator in opposition to the action of said coil, said element being sensitive to local temperature changes so as to compensate for the effect of such changes upon said coil.

12. In a distance type thermometer, the combination of a long helically wound Bourdon coil, said coil consisting of a plurality of sets of turns, different sets being wound in different axial directions but in the same circumferential direction, a bulb, a capillary tube connecting said bulb and coil, said coil, bulb and tube being completely filled with an expansible liquid, the volume of liquid contained in said coil being large compared with the liquid in the capillary tube, a bi-metallic compensating element wound into helical form and placed within the helix formed by said Bourdon coil, and an indicator directly connected to said coil by means of said compensating element and without the interposition of movement multiplying mechanism, said compensating element acting upon said indicator in the opposite direction to the action of the coil thereon when the compensating element and coil are subjected to local temperature variations.

13. In a distance type thermometer, the combination of a helically wound Bourdon coil having a large number of turns, a bulb, a thermally insulated capillary tube connecting said bulb and coil, said coil, capillary tube and bulb being completely filled with thermally expansible liquid, and indicator having direct operative connection with said coil without the interposition of movement multiplying gearing, and a compensating element acting upon said indicator in opposition to the coil when said compensating element and coil are subjected to local temperature variations, said compensating element being uninfluenced by variations in atmospheric pressure.

14. In a gage, the combination of a casing and an indicator therein, a bi-metallic compensating coil connected to said indicator, a Bourdon coil encircling said compensating coil, said compensating coil and Bourdon coil being arranged to act in opposite directions upon said indicator when subjected to local temperature changes, a bulb outside of said casing, and a tube connecting said bulb and Bourdon coil.

15. In a gage, the combination of a fixed support, a rotatable arbor, an indicator thereon, a bi-metallic coil surrounding said arbor and connected thereto at one end, a Bourdon coil surrounding said compensating coil and connected at its free end to the free end of said compensating coil, the other end of said Bourdon coil being mounted upon said fixed support.

16. In a gage, the combination of a rotatable arbor, an indicator, mounted thereon, a hollow pressure responsive element and a compensating element, both in coiled form and surrounding said arbor, an end of one of said coils being connected to the arbor and one end of the other coil being connected to a fixed support, the other ends of said coils being connected respectively to the opposite ends of a lever movably mounted on said arbor.

17. In a gage, the combination of a casing having a back plate with a recess therein, a bearing plate extending across said recess, an arbor having its rear end journaled in said bearing plate, means forming a bearing for the front end of said arbor, an indicator carried by said arbor, a helical Bourdon spring having turns of equal diameter surrounding said arbor and having one end connected to said back plate, and means forming an operative connection between the other end of said Bourdon spring and said arbor.

18. In a gage the combination of a casing, a back blate for the casing, spaced supports extending from the back plate towards the front of the casing, a dial fixed to the supports, an arbor having a front journal bearing carried by the dial and having a rear journal bearing on the back plate between said supports, a pointer carried by the arbor, and operating means for the arbor mounted between the dial and back plate.

19. In a gage, the combination of a pointer, a compensating element having one end rigid with said pointer, a pressure responsive element connected to the other end of said compensating element, the pressure responsive element comprising a helically coiled Bourdon spring having a relatively large number of turns, and a capillary tube communicating with said pressure responsive element, both the tube and said element being filled with an expansible liquid, the capacity of said element being large relative to the capacity of the tube.

20. A distance type thermometer having a bulb, an indicating gage, and corrugated capillary transmission tubing connecting said bulb and gage.

21. In combination, an indicating member, a pressure sensitive member for operating the same, a member for subjecting said pressure sensitive member to pressure variations, and capillary tubing provided with one or more longitudinal depressions for transmitting the pressure variations of said last-mentioned member to said pressure sensitive member.

22. In a gage, the combination of a rotatable shaft, an indicator connected thereto, a member rotatable about the axis of said shaft, a hollow pressure responsive element and a compensating element, both in coiled form and concentric with said shaft, one end of one of said coils being connected to the shaft, and one end of the other of said coils being connected to a fixed support, the other ends of said coils being connected, respectively, to said member in such manner as to act thereon in opposite directions.

23. In a pressure operated indicating instrument in combination a Bourdon coil, a coiled compensating spring substantially coaxial with the Bourdon coil, a member pivotally mounted substantially coaxially with the Bourdon coil and the compensating spring and forming a connection between them, and an indicator member connected for operation from the compensating spring.

24. In a pressure operated indicating instrument in combination a Bourdon coil, an indicator element, and means connecting the indicator element for operation by the Bourdon coil comprising a coiled compensating spring mounted substantially coaxially with the Bourdon coil and connected at one end with the indicator element, and rigid rotary means mounted coaxially with the Bourdon coil and the compensating spring and connecting an end of the Bourdon coil with an end of the compensating spring.

25. In a pressure operated indicating instrument in combination, a Bourdon coil, a coiled compensating spring within the Bourdon coil, and a lever pivoted at the center of the compensating spring and constituting a connection between the Bourdon coil and the compensating spring.

26. In a pressure operated indicating instrument, in combination, an indicator element, a rotary shaft carrying said indicator element, a Bourdon coil, and connections between the Bourdon coil and the shaft comprising a coiled compensating spring connected to the shaft and a member pivoted coaxially with the shaft and constituting a connection between the compensating spring and the Bourdon coil.

In testimony whereof, I have signed my name to this specification this 8th day of February, 1918.

HERMAN SCHLAICH.